United States Patent [19]

Morita et al.

[11] Patent Number: 4,513,024

[45] Date of Patent: Apr. 23, 1985

[54] PROCESS FOR FORMING PHOSPHOR SCREEN

[75] Inventors: Yasukazu Morita; Naomitsu Watanabe, both of Mobara, Japan

[73] Assignee: Hitachi, Ltd., Tokyo, Japan

[21] Appl. No.: 408,679

[22] Filed: Aug. 16, 1982

[30] Foreign Application Priority Data

Aug. 21, 1981 [JP] Japan .................................. 56-130108

[51] Int. Cl.³ .......................... B05D 5/06; B05D 5/12
[52] U.S. Cl. ........................................ 427/65; 427/68; 427/73
[58] Field of Search .............................. 427/65, 73, 68

[56] References Cited

U.S. PATENT DOCUMENTS 2,873,205  2/1959  Dijkstra et al. ........................ 427/73
2,909,444  10/1959  Seats et al. ........................ 427/65 X Primary Examiner—Michael R. Lusignan
Attorney, Agent, or Firm—Antonelli, Terry & Wands

[57] ABSTRACT

A phosphor screen good in quality without greatly lowering brightness can be produced on a cathode-ray tube faceplate by the settling process wherein there is used a suspension of phosphor particles which are susceptible to hydrolysis or dissolution prepared by using an alkaline aqueous solution having a pH of 10 to 13 and if necessary with a small amount of water glass, or the above-mentioned phosphor suspension is poured into a cushion solution having a pH of 10 to 13, said cushion solution being able to contain a small amount of water glass.

10 Claims, 4 Drawing Figures

PROCESS FOR FORMING PHOSPHOR SCREEN

BACKGROUND OF THE INVENTION

This invention relates to a process for forming a phosphor screen on a cathode-ray tube faceplate, and particularly to a process for forming a phosphor screen by using phosphors which are susceptible to hydrolysis or dissolution such as alkaline earth metal sulfide phosphors by a settling process.

As processes for forming phosphor screens uniform in quality on cathode-ray tubes for televisions, X-ray fluorescent tubes (e.g., image intensifier tubes), and other cathode-ray tubes, there has been employed a settling process. According to the settling process, the phosphor screen uniform in quality is formed by placing in a bulb (or a tube) a so-called cushion solution which is an aqueous solution of electrolyte such as barium acetate, barium nitrate, etc., having a pH of less than 9, pouring into the bulb a phosphor suspension comprising prescribed amounts of phosphor particles, pure water and a dilute water glass solution or a mixed solution thereof, allowing the resulting mixture to stand, while a part of water glass is gelled and adhered to the phosphor particles, which are settled out of the suspension.

An explanation will be give more concretely referring to the attached FIG. 1, which is a cross-sectional view of essential portions showing an example of the settling process. In FIG. 1, a bulb 1 for a cathode-ray tube is set so that a faceplate panel portion 1a is placed down, and a cushion solution 2 such as a dilute solution of barium acetate (having a pH of less than 9) is poured into the bulb 1 in a prescribed amount. Subsequently, a phosphor suspension comprising a prescribed amount of phosphor particles, pure water and a dispersing agent, and a water glass aqueous solution are poured into the bulb 1 separately or simultaneously or as a mixed solution thereof. Then, gellation and deposition take place in the solution in the bulb 1. By allowing the solution to stand for a few minutes to several tens minutes, a laminated film of phosphor is formed on the inner surface of the faceplate. Thereafter, the supernatant liquid is removed by a conventional declining method or suction method, followed by drying of the residual film.

The above-mentioned settling process has been employed from old due to relatively simple procedure, but it has a fatal defect in that it cannot be applied to all kinds of phosphors, particularly it cannot practically be applied to phosphors which are susceptible to hydrolysis or dissolution in water. For example, when phosphors which are easily dissolved in water or easily hydrolyzed, such as alkaline earth metal sulfide phosphors having as main bodies alkaline earth metal sulfides, rare earth phosphors having as main bodies alkali metal compounds (e.g., $LiYO_2$, $NaYO_2$, $KYO_2$, etc.) and other phosphors having as main bodies LaOBr, BaFCl, etc., or complex phosphors thereof, are used for forming phosphor screens by the settling process mentioned above, luminescence properties (brightness) are remarkably lowered or extinguished so as to make practical application impossible. Reasons for such a lowering in brightness seem to be as follows:

(1) When phosphor particles contact with water, there are formed on the surfaces thereof hydroxide or oxide layers, the formation of which proceeds into inner portions thereof.

(2) As a result of hydrolysis, there arises a pH change which causes chemical changes in a binder such as water glass component and the like contained in water.

(3) As a result of hydrolysis, phosphor materials are ionized. The resulting ions react with a binder and the like to form non-luminescent substances on the surfaces of phosphor particles.

SUMMARY OF THE INVENTION

An object of this invention is to provide a process for forming a phosphor screen on a cathode-ray tube faceplate by the settling process using phosphors such as alkaline earth metal sulfide phosphors which are practically not used in the settling process due to their hygroscopic properties and their properties of being easily dissolved in water or hydrolyzed, although they have inherently excellent luminescence properties.

This invention provides a process for forming a phosphor screen on a cathode-ray tube faceplate by the settling process using a suspension of phosphor particles which are susceptible to hydrolysis or dissolution, characterized by using a phosphor suspension obtained by suspending phosphor particles in an alkaline aqueous solution which has a pH of 10 to 13 and may contain a small amount of water glass, and if necessary, adding said phosphor suspension to a cushion solution, which is an alkaline aqueous solution having a pH of 10 to 13 and may contain a small amount of water glass, in the tube.

DESCRIPTION OF THE PREFERRED EMBODIMENTS

The phosphors which are easily dissolved in water or easily hydrolyzed (i.e. which are susceptible to hydrolysis or dissolution) and usable in this invention include alkaline earth metal sulfide phosphors having as main bodies alkaline earth metal sulfides, rare earth phosphors having as main bodies alkali metal compounds (e.g., $LiYO_2$, $NaYO_2$, $KYO_2$, etc.), other phosphors having as main bodies LaOBr, BaFCl, etc., and complex phosphors thereof.

In order to solve various problems which arise when the above-mentioned phosphors are used in the settling process, concrete examination was conducted using a phosphor of calcium sulfide activated with cerium (Cas:Ce) which is more effective one as green-emitting phosphor among alkaline earth metal sulfide phosphors.

Figure 1:
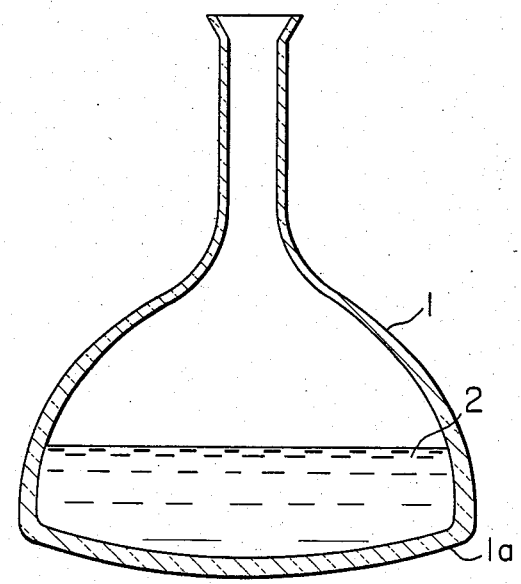
FIG. 1 is a cross-sectional view of essential portions of a bulb for explaining a process for forming a phosphor screen by the settling process.
Figure 2:
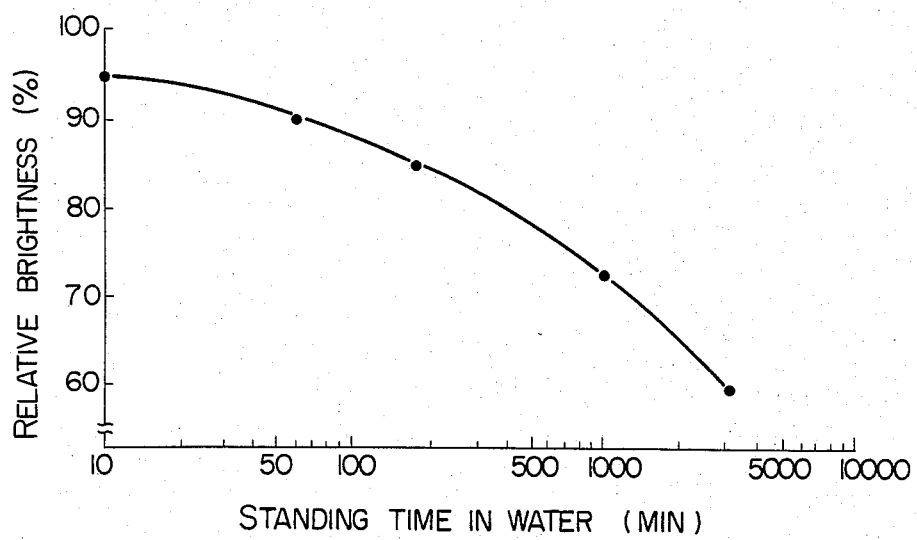
FIG. 2 is a graph showing a relationship between relative brightness (lowering in brightness) and standing time of phosphor particles in water.

As a result, there were found the following points:

(i) When the phosphor particles are allowed to stand in pure water, lowering in brightness of the resulting phosphor screen is within about 10% as shown in FIG. 2 in the case of a short standing time such as within 1 hour, but the lowering in brightness becomes about 20% or more when the standing time is as long as 8 hours or longer.

(ii) When dilute water glass which functions as binder is mixed with phosphor particles, gellation and coagulation of the phosphor particles become remarkable in the case of water glass content becoming 2% by weight or less. Relative brightness of a cathode-ray tube obtained by using a phosphor particle suspension containing water glass in an amount of 1 to 5% by weight is lowered to below 60% as shown by the curve I in FIG. 3.

(iii) When the phosphor particle suspension as obtained in (ii) mentioned above is mixed with a cushion solution which is a dilute aqueous solution of barium acetate (pH<9), the phenomenon as mentioned in above (ii) becomes more remarkable so as to fail to obtain a good phosphor screen.

Among the experimental results mentioned above, the phonomenon (ii) seems to derive from special interactions of the phosphor which is easily hydrolyzed and the water glass. That is, when water glass is diluted with water, free silicic acid ($xSiO_2 \cdot yH_2O$) generally increases in amount. Since a part of the free silicic acid is present in the state of hydrosol, it is easily coagulated in the presence of an electrolyte to form a hydrogel. Further, since the phosphor such as containing calcium sulfide, which is easily hydrolyzable, has a function as electrolyte by discharging ions of its main component in water, the growth of hydrogel of silicic acid increases at a concentration of the water glass component as low as about 2% by weight or less. In addition the metal ions discharged in the water react with silicic acid to form a silicate (in the case of calcium sulfide, calcium metasilicate $CaSiO_3$ being formed). These materials are deposited on surfaces of phosphor particles or phosphor screen to form a non-luminescent layer, which lowers the limunescence efficiency and at the same time makes it difficult to obtain a good phosphor screen due to coagulation.

Therefore, in the case of forming a phosphor screen by the settling process using phosphors which can be easily dissolved in water or easily hydrolyzed such as alkaline earth metal phosphors together with water glass, it is important to eliminate the interactions of the water glass and the phosphor giving the worst influences.

Figure 4:
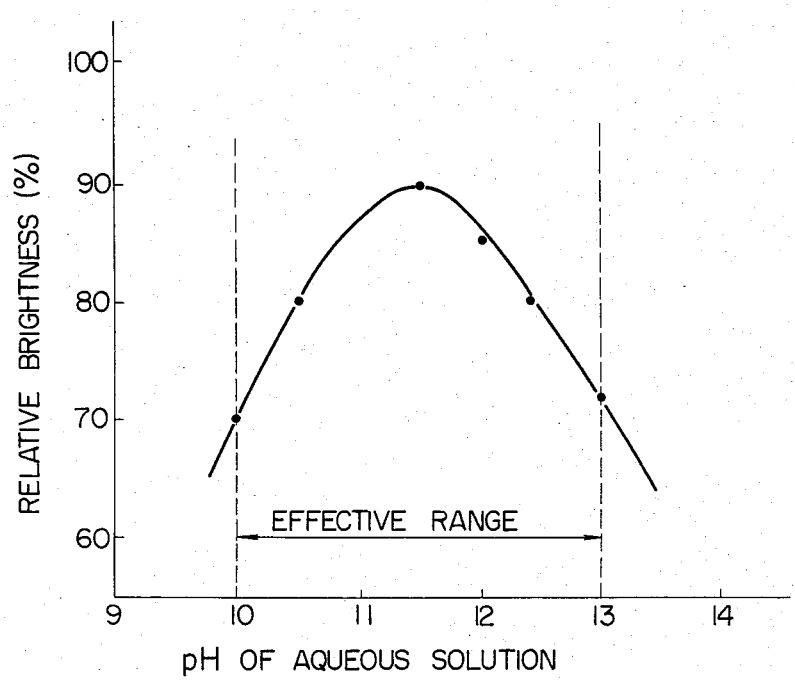
FIG. 4 is a graph showing a relationship between relative brightness and pH of aqueous solution.

From the viewpoint mentioned above, various experiments and studies were conducted. As a result, there was found that when an alkaline aqueous solution having a pH of 10 to 13 is used for diluting water glass, lowering of brightness of the resulting phosphor screen can be controlled in about 30% or less as shown in FIG. 4.

Therefore, the fundamental points of this invention using the settling process can be summarized as follows.

(1) In the prior art processes, acidic or low alkaline (pH<9) aqueous solutions of diluted electrolyte have been used as cushion solution. In contrast, in this invention, an alkaline aqueous solution which has a pH of 10 to 13 and may contain a small amount of water glass is used as cushion solution.

(2) In the prior art processes, pure water has been simply used for diluting water glass solution (except for the case of cushion solution). In contrast, in this invention, an alkaline aqueous solution having a pH of 10 to 13 is used for diluting water glass solution.

(3) In this invention, the phosphor suspension is prepared by dispersing phosphor particles in an alkaline aqueous solution which has a pH of 10 to 13 and may contain a small amount of water glass.

The alkaline aqueous solution having a pH of 10 to 13 can be obtained by a conventional process. Typical examples of such an alkaline aqueous solution are aqueous solutions of potassium hydroxide (KOH) or sodium hydroxide (NaOH).

Figure 3:
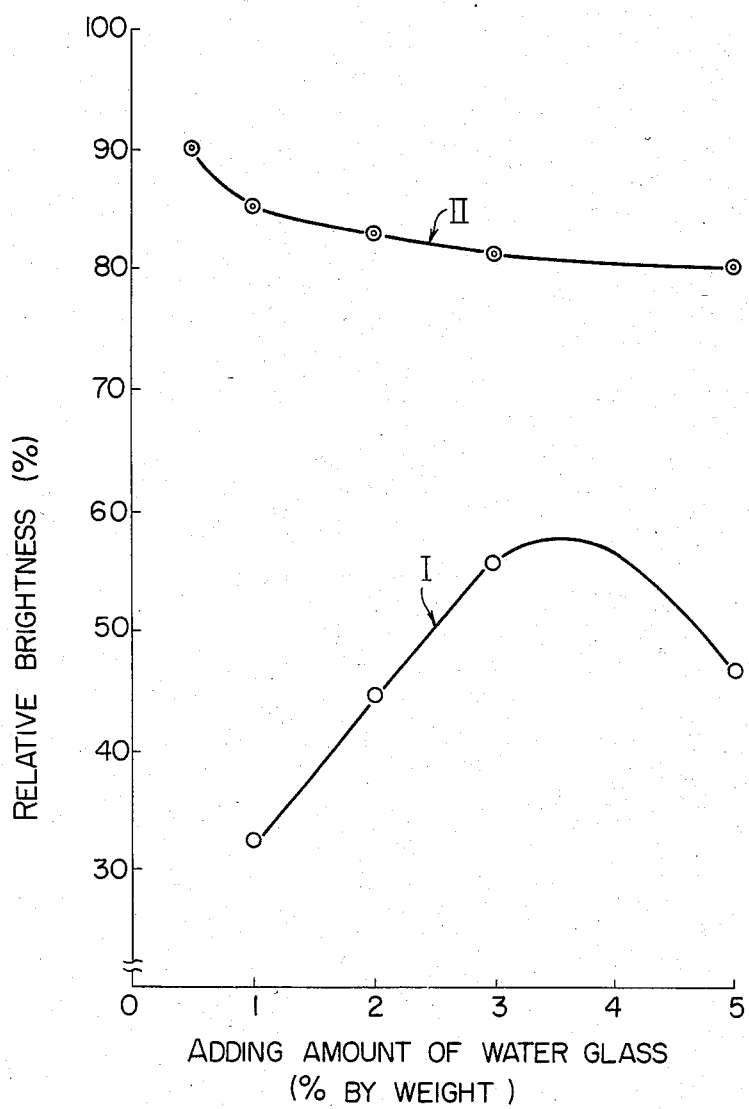
FIG. 3 is a graph showing a relationship between relative brightness and adding amount of water glass in the cases of prior art and this invention.

When a phosphor screen of monocolor cathode-ray tube was produced by using an alkaline aqueous solution having a pH of 10 to 13 based on the above-mentioned studies (CaS:Ce being used as phosphor), lowering in brightness is about 20% or less as shown by the curve II in FIG. 3. This means that relative brightness of about 80% or more can be maintained according to this invention.

Concrete embodiments of the process of this invention can be summarized as follows.

(a) A water glass solution is diluted with an alkaline aqueous solution having a pH of 10 to 13 so as to make the water glass content preferably 5% by weight or less, more preferably 0.5 to 2.0% by weight. To the resulting solution, phosphor particles are added and suspended to give a phosphor suspension, which is poured into a bulb to give a phosphor screen directly.

(b) A water glass solution is diluted with an alkaline aqueous solution having a pH of 10 to 13 so as to make the water glass content preferably 5% by weight or less, more preferably 0.5 to 2.0% by weight. To the resulting solution, phosphor particles are added and suspended to give a phosphor suspension. On the other hand, a cushion solution having a pH of 10 to 13 is prepared and poured into a bulb. To the cushion solution, the phosphor suspension mentioned above is added to form a phosphor screen.

(c) A cushion solution is prepared by diluting a water glass solution with an alkaline aqueous solution having a pH of 10 to 13 so as to make the water glass content preferably 5% by weight or less, more preferably 0.5 to 2.0% by weight. On the other hand, a phosphor suspension is prepared by suspending phosphor particles in an alkaline aqueous solution having a pH of 10 to 13. After placing the cushion solution in a bulb, the phosphor suspension is poured into the cushion solution to form a phosphor screen.

(d) A cushion solution is prepared by diluting a water glass solution with an alkaline aqueous solution having a pH of 10 to 13 so as to make the water glass content preferably 5% by weight or less, more preferably 0.5 to 2.0% by weight. On the other hand, a water glass solution is diluted with an alkaline aqueous solution having a pH of 10 to 13 so as to make the water glass content preferably 5% by weight or less, more preferably 0.5 to 2.0% by weight, followed by suspending of phosphor particles to give a phosphor suspension. After placing the cushion solution in a bulb, the phosphor suspension is poured into the cushion solution to form a phosphor screen. In this case, the total amount of water glass is controlled not to exceed 5% by weight based on the total weight of the cushion solution and the phosphor suspension.

The process of this invention can be applied to forming phosphor screens on cathode-ray tubes for television, X-ray fluorescent tubes (e.g., image intensifier tubes), and other cathode-ray tubes.

This invention is illustrated by way of the following Examples.

EXAMPLE 1

This is an example of forming a phosphor screen by the setting process by directly pouring a phosphor suspension which is a mixture of dilute water glass solution and phosphor particles into a bulb.

Initially, an aqueous solution of 0.1% by weight potassium hydroxide was prepared. The pH of this solution was about 12.0. To this aqueous solution, a potassium water glass ($K_2O.nSiO_2$, n=3.9) solution having a water glass content of 28% by weight was added with stirring so as to make the water glass content about 1% by weight. To the resulting mixture, phosphor particles of calcium sulfide activated with cerium (CaS:Ce) were added and stirred for about 1 minute. In this case, the mixing ratio was preferably 0.4 g of the phosphor particles per about 100 ml of the mixed solution. The resulting phosphor suspension was directly poured into a bulb and allowed to stand for a several minutes to deposit the phosphor particles on the inner surface of the faceplate of the bulb. Then, the supernatant liquid was removed by a conventional declining method or suction method, followed by drying of the residual film.

The lowering in brightness of the resulting phosphor screen was about 15%. In other words, the resulting phosphor screen had a relative brightness of about 85% compared with the brightness of untreated phosphor.

EXAMPLE 2

This is an example of forming a phosphor screen by the settling process wherein a cushion solution is placed previously in a bulb so as to make dispersion or diffusion of phosphor particles easy, followed by pouring of a phosphor suspension containing a binder into the bulb.

Initially, a cushion solution which is an alkaline aqueous solution having a pH of 11.5 was prepared and poured into a bulb. On the other hand, an alkaline aqueous solution having a pH of 11.5 was prepared in an amount corresponding to 10% by weight of the cushion solution in another vessel. A potassium water glass ($K_2O.nSiO_2$, n=3.5) solution having a water glass content of 25% by weight was weighed so as to make the water glass content 0.5% by weight based on the total alkaline aqueous solutions and added to the alkaline aqueous solution in another vessel, followed by stirring for about 30 seconds. To the resulting mixture, phosphor particles of calcium sulfide activated with cerium (CaS:Ce) were added and stirred for about 1 minute. In this case, the mixing ratio was preferably about 0.5 g of phosphor particles per about 100 ml of the mixed solution. The resulting phosphor suspension was poured into the bulb wherein the cushion solution had been placed. In this case, when a proper pouring means was used, the dispersion became good and uniform diffusion was obtained. The suspension was allowed to stand for a several minutes to deposit phosphor particles. Then, the supernatant liquid was removed by a conventional declining method or suction method, followed by drying of the residual film. In this example, it is suitable to use an alkaline aqueous solution having potassium hydroxide in an amount of about 0.05% by weight or sodium hydroxide in an amount of about 0.03% by weight.

The lowering in brightness of the resulting phosphor screen was about 10%. In other words, the resulting phosphor screen had a relative brightness of about 90% compared with the brightness of untreated phosphor.

EXAMPLE 3

This is an example of adding water glass to the cushion solution used in Example 2.

Initially, a prescribed amount of an alkaline aqueous solution having a pH of 10.5 was placed in a bulb. Then a potassium water glass ($K_2O.nSiO_2$, n=3.4) solution having a water glass content of about 28% by weight was added to the alkaline aqueous solution so as to make the water glass content 3% by weight. The resulting mixture was used as a cushion solution. On the other hand, an alkaline aqueous solution having a pH of 10.5 was prepared in an amount corresponding to 10% by weight of the cushion solution in another vessel. A potassium water glass ($K_2O.nSiO_2$, n=3.9) solution having a water glass content of 28% by weight was added to the alkaline aqueous solution in another vessel so as to make the water glass content 3% by weight, followed by stirring. To the resulting mixture, phosphor particles of calcium sulfide activated with cerium (CaS:Ce) were added and stirred for about 1 minute. In this case, the mixing ratio is preferably 0.5 g of phosphor particles per about 100 ml of the mixed solution to give a phosphor suspension. The phosphor suspension was poured into the bulb wherein the cushion solution had been placed. Thereafter, there were employed the same procedures as described in Example 2 to give a phosphor screen. In this example, it was suitable to use an alkaline aqueous solution having potassium hydroxide in an amount of 0.1% by weight or sodium hydroxide in an amount of 0.05% by weight.

The lowering in brightness of the resulting phosphor screen was about 19%. In other words, the resulting phosphor screen had a relative brightness of about 81% compared with the brightness of untreated phosphor.

COMPARATIVE EXAMPLE 1

The procedures of Example 2 were repeated except for using as cushion solution an aqeous solution of barium acetate (pH 8.5) and using pure water for dilution of water glass in place of the alkaline aqueous solution of pH 11.5.

The lowering in brightness of the resulting phosphor screen was more than 70%. In other words, the resulting phosphor screen had a relative brightness of less than 30% compared with the brightness of untreated phosphor.

COMPARATIVE EXAMPLE 2

The procedures of Example 1 were repeated except for using pure water (pH about 7.0) in place of the alkaline aqueous solution having a pH of about 12.0.

The lowering in brightness of the resulting phosphor screen was about 70%. In other words, the resulting phosphor screen had a relative brightness of about 30% compared with the brightness of untreated phosphor.

As mentioned above, according to the process for forming a phosphor screen of this invention, there can be obtained remarkably excellent advantages such as the formation of phosphor screen good in quality and a little in brightness lowering by using alkaline earth metal sulfide phosphors or other phosphors easily dissolved in water or easily hydrolyzed, these phosphors having been regarded as impossible or unsuitable for forming phosphor screens by the settling process. The advantages of this invention can be summarized as follows:

(1) Lowering in brightness according to the prior art processes is more than about 60%, but it is less than about 30% according to this invention.

(2) According to the prior art processes, when the water glass content is about 1% by weight or less, a phosphor screen good in quality is hardly obtained due to marked gellation or coagulation. In contrast, according to this invention, such a problem as mentioned above does not take place and there can be obtained phosphor screens good in quality.

(3) Chemicals and materials used in this invention are those used in the prior art processes or those easily available. Further, the procedures for forming phosphor screens are not so different from those of the prior art processes that the production apparatus conventionally used can be used with slight modifications without great changes in apparatus and great investment.

What is claimed is:

1. In a process for forming a phosphor screen on a cathode-ray tube faceplate by a settling process using a suspension of phosphor particles, the improvement which comprises using as the suspension one obtained by suspending phosphor particles which are susceptible to hydrolysis or dissolution in an alkaline aqueous solution which has a pH of 10 to 13 and contains a small amount of water glass.

2. In a process for forming a phosphor screen on a cathode-ray tube faceplate by a settling process using a suspension of phosphor particles, the improvement which comprises using a cushion solution having a pH of 10 to 13 and adding to the cushion solution a suspension obtained by suspending phosphor particles which are susceptible to hydrolysis or dissolution in an alkaline aqueous solution which has a pH of 10 to 13 and contains a small amount of water glass.

3. In a process for forming a phosphor screen on a cathode-ray tube faceplate by a settling process using a suspension of phosphor particles, the improvement which comprises using a cushion solution having a pH of 10 to 13 and containing a small amount of water glass, and addding to the cushion solution a suspension obtained by suspending phosphor particles which are susceptible to hydrolysis or dissolution in an alkaline aqueous solution which has a pH of 10 to 13 and may contain a small amount of water glass.

4. A process according to claim 1, 2 or 3, wherein the phosphor particles are those containing as base material one or more alkaline earth metal sulfides, rare earth phosphors containing as base material one or more alkali metal compounds, those containing as base material LaOBr or BaFCl, or a mixture thereof.

5. A process according to claim 1 or 2, wherein the amount of water glass in the suspension of phosphor particles is 5% by weight or less.

6. A process according to claim 3, wherein the amount of water glass in the cushion solution is 5% by weight or less, the amount of water glass in the suspension of phosphor particles is 5% by weight or less, and the total amount of water glass is 5% by weight or less based on the total weight of the cushion solution and the suspension.

7. A process for forming a phosphor screen on a cathode-ray tube faceplate, which comprises placing a cushion solution having a pH of 10 to 13 and being able to contain a small amount of water glass in a bulb of a cathode-ray tube, pouring a suspension obtained by suspending phosphor particles which are susceptible to hydrolysis or dissolution in an alkaline aqueous solution which has a pH of 10 to 13 and may contain a small amount of water glass to the cushion solution, the water glass being present in the cushion solution and/or the suspension, allowing the resulting mixtures to stand still to deposit a phosphor layer, removing the remaining solution slowly, and drying the deposited phosphor layer.

8. A process according to claim 7, wherein the amount of water glass is 5% by weight or less based on the weight of the cushion solution, the suspension or the total of the cushion solution and the suspension.

9. A process according to claim 1, 2, 3 or 7, wherein said alkaline aqueous solution is an aqueous solution of potassium hydroxide or sodium hydroxide.

10. A process according to claim 6, wherein the amount of water glass in the cushion solution is 0.5 to 2.0% by weight.

* * * * *